INVENTOR.
WALLACE C. BALLAM
BY Wm. E. Ford
ATTORNEY

INVENTOR.
WALLACE C. BALLAM
BY Wm. E. Ford
ATTORNEY

April 27, 1965   W. C. BALLAM   3,180,040
CONSTANT VELOCITY GOVERNOR FOR HYDRAULIC PIPE LINE DREDGES
Filed July 31, 1961   3 Sheets-Sheet 3

INVENTOR.
WALLACE C. BALLAM
BY Wm. E. Ford
ATTORNEY

United States Patent Office 3,180,040
Patented Apr. 27, 1965

3,180,040
CONSTANT VELOCITY GOVERNOR FOR
HYDRAULIC PIPE LINE DREDGES
Wallace C. Ballam, P.O. Box 183, Madisonville, La.
Filed July 31, 1961, Ser. No. 128,069
21 Claims. (Cl. 37—59)

This invention relates to an improvement in the form of a constant velocity governor for hydraulic pipe line dredges.

In dredging operations, a cutter cuts material away from an embankment. A dredge line includes a suction pipe, a centrifugal dredge pump, and a discharge pipe through which the dredged material is conveyed to various distances and elevations. In operation the dredge will operate at optimum efficiency if the velocity of flow through the dredge line remains at a near constant value. There is a tendency for the velocity to vary due to the uneven intake of materials into the suction pipe.

The operator has full control of the manipulation of the dredge. In the lever room are the vacuum and discharge pressure gauges which guide the operator in the normal operation of the pump and feed.

The vacuum in the suction pipe is greater when pumping solids than when water only is passing through, becoming maximum when the suction is choked. The discharge pressure falls off for chokes in the suction and rises for obstructions occurring in the discharge pipe. The leverman learns to keep the gauge readings at that point at which the pump will carry the maximum amount of material without choking. This is less than the theoretical capacity of the dredge, which is not used due to the loss that would result from frequent choking due to the irregular feed.

In present practice there is no control over the ordinary variation in the amount of material entering the suction pipe, other than the skill of the operator. Both vacuum and pressure readings acquaint the operator of restricted suction, the former by rising and the latter by falling, but the vacuum is more sensitive than the pressure responding more quickly to the abnormal condition.

As the operator attempts to obtain maximum yardage by fast feeding, he is frequently in trouble due to the crumbling and caving characteristics of most material embankments resulting in a dangerous excess vacuum which frequently creates a disasterous chain of events, such as dropping of the velocity to the extent of allowing the material to settle in the entire dredge line. Consequently air is drawn into the pump, resulting in excessive pump cavitation. Consequently the prime mover, being suddenly relieved of its load, resultant racing occurs as the pump impeller churns in a mixture of air, water and solids, thereby setting up excessive and damaging machinery vibration, such vibration being more particularly damaging to the pump, packing gland, and thrust bearing. As this occurs, the operator has the alternative of stopping the feed, or quickly raising the suction away from the material thereby to quickly admit a large amount of relatively cleaner water to relieve the abnormal condition.

As the vacuum at this point causes extreme pulsation, the impact of the inrushing water, accompanied by the material already in the partially choked dredge line causes the slugging and subsequent total pump choke with the consequential total loss of suction and the immobilization of the entire dredge line, resulting in shut down, and most probably in the disassembly of the pump, and of the other parts of the line and the manual removal of the material.

It is therefore a principal object of the present invention to enable the full capacity of a dredge to be employed by the introduction of a novel velocity governor, which enables a maximum amount of feed at all times, without fear of choking anywhere in the dredge line, including suction pipe, dredge pump, and discharge pipe.

It is a further object of this invention to automatically position a suction compensating valve closely adjacent to the entrance of the suction pipe to permit the addition of the proper amount of relatively clean water to mix with the material shortly after its entry into the suction pipe, the water admitted being directly proportionate to the command of a predetermined pressure-vacuum differential to maintain a constant mean effective velocity.

It is a further object of this invention to enable the operator to maintain a full constant feed on a dredge for maximum capacity and efficiency without fear of overfeeding and resultant choking.

It is a further object of this invention to provide a means to further homogenize material after entering the suction pipe and while it is passing the suction compensating valve.

It is a further object of this invention to provide a means for a continuity of flow of homogenized material in a dredge line.

It is a further object of this invention to provide a means for maintaining a constant mean effective velocity of flow in a dredge line.

It is a further object of the invention to provide a means for maintaining a constant mean effective pressure in the discharge pipe of a dredge line.

Another object of the invention is to provide a means for maintaining a constant mean effective vacuum in the suction pipe of a dredge line.

Still another object of the invention is to provide a means to maintain a constant mean effective peripheral velocity in the centrifugal pump of a dredge line.

It is an additional object of the invention to provide a constant velocity governor for hydraulic pipe line dredges which governs against the occurrence of any excesses or abnormal conditions in the passage of dredged material through the dredge line.

It is another and additional object of the invention to provide a constant velocity governor of this class which admits compensating water into the suction pipe of a dredge line directly in proportion to the amount needed.

Other and further objects will be apparent when the specification is considered in connection with the drawings, in which.

Figure 1:
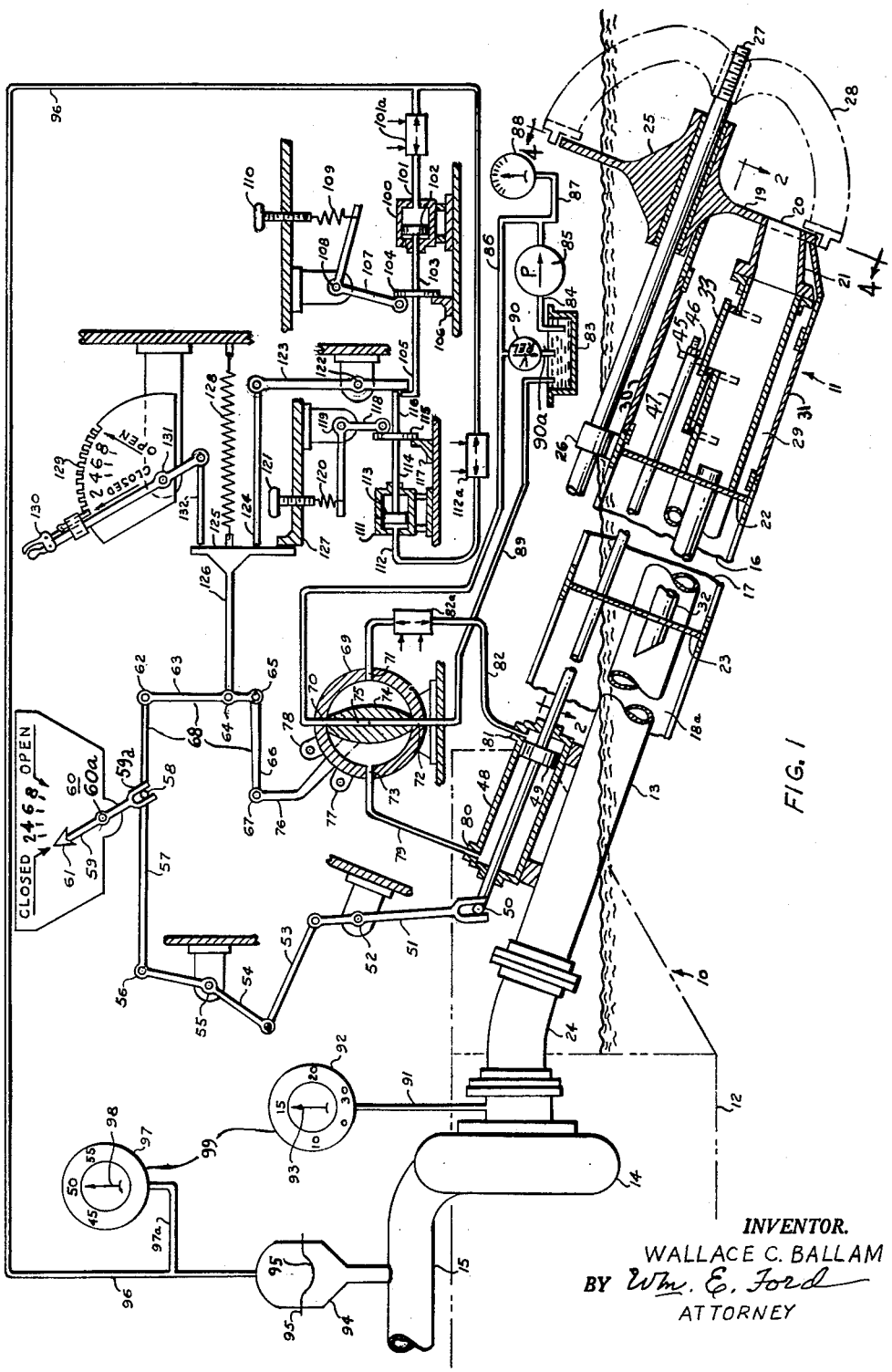
FIG. 1 is an overall view of a constant velocity governor for a hydraulic pipe line dredge, showing dredge ladder parts in sectional elevation, and with parts shown diagrammatically under normal pumping conditions.

Referring now in detail to the drawings in which like reference numerals are applied to like elements in the various views, a constant velocity governor and suction compensating valve system 10 is shown in FIG. 1. The system includes a dredge hull 12 and a main dredge line extending through the length of the dredge. The dredge line consists of a suction pipe 13, a centrifugal dredge pump 14 and a discharge pipe 15. In FIG. 1 a conventional dredge ladder 11 is viewed from the starboard side, and this view shows the forward portion 16 and an intermediate portion 17 of the ladder, while the after portion of the ladder is not shown, such after portion being conventionally trunnionally mounted in a recess in the dredge hull, and such details are also omitted in this view.

Figure 2:
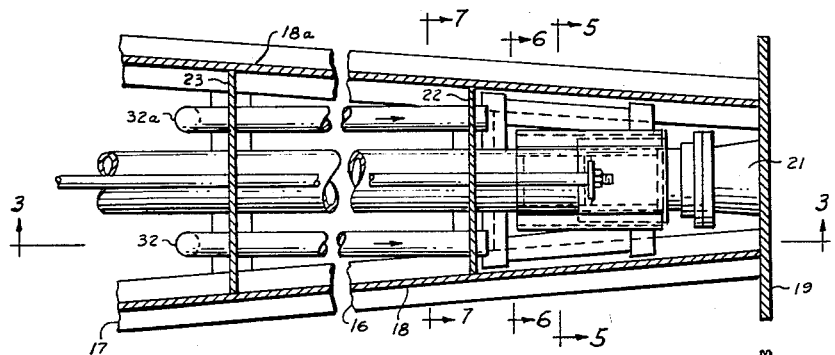
FIG. 2 is a plan view of forward ladder parts, part in section, taken along line 2—2 of FIG. 1.

The ladder 11 includes respective starboard and port plate girders 18 and 18a, best shown now in FIG. 2, which are tied together intermediately by bracing cross-beam plates 22 and 23 and a circular head plate 19 at its forward end.

The mouth of the suction orifice 20 at the inlet through the head plate 19 is of rectangular cross-section and such orifice 20 supports a suction mouth piece 21 which extends afterward and provides a round opening and a flange therearound by which the mouth piece 21 is connected to a corresponding flange at the forward end of the suction pipe 13.

The suction pipe 13 extends aft through, and is supported by, the transverse cross-beam plates 22 and 23, and includes a flexible connection 24 which forms the suction pipe connection to the centrifugal pump 14, such flexible connection permitting movement in a vertical plane, corresponding with the lifting and lowering of the ladder as is conventionally accomplished as by lines or falls connected to the ladder and extending over conventional A-frame structure, not shown.

Figure 3:
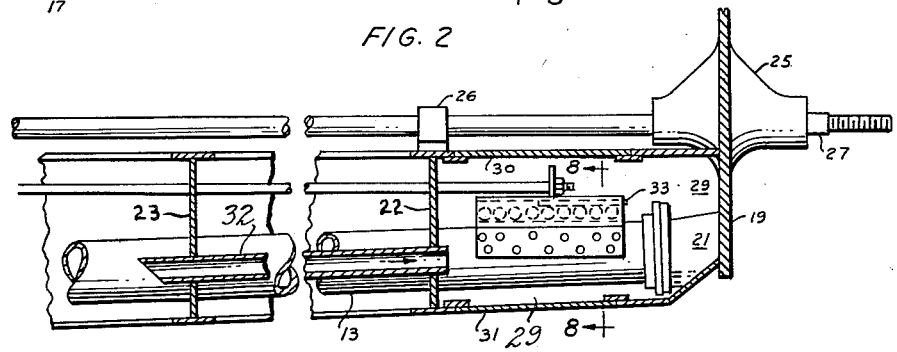
FIG. 3 is an elevational view, part in section, taken along line 3—3 of FIG. 2.

Referring now to construction details shown in FIGS. 1–3, inclusive, a concentric and integrally connected part of the circular head plate 19 consists of a relatively large main bearing 25. Also an intermediate bearing 26 is shown supported by, and centrally upon the transverse cross-beam plate 22, and a plurality of such bearings are spaced afterwardly. A drive motor, not shown, adjacent the ladder trunnion mount, also not shown, rotates a cutter drive shaft 27, such shaft extending forwardly from the motor through said bearings and through the large main bearing 25 to terminate forwardly in a short stub shaft by means of which a rotary cutter 28, shown in phantom in FIG. 1, is securely fastened to the drive shaft 27, while the after, outer rim or ring of the cutter concentrically encompasses the circular head plate 19.

Referring now to the improvements, and more particularly to those shown in FIGS. 1–4, inclusive, a clean water compartment 29 is provided as a conduit means and is formed by conventional ladder parts consisting of the starboard girder plate 18, the port girder plate 18a, the circular plate 19, and the cross-beam plate 22. To the conventional elements a flush top plate 30 and a flush bottom plate 31 are added to enclose the compartment 29 which constitutes a novel part of the invention for the purpose of locating a suction compensating valve, to be hereinbelow described in detail, as near as possible to the suction mouth orifice 20.

As best visualized by considering FIG. 2, a pair of open clean water supply pipe constituting conduit means 32 and 32a, on opposite sides of the suction pipe 13, extend through the cross-beam plate 22 into the compartment 29 from a sufficient distance aft to communicate with substantially clear or clean water, and such pipes insure a supply of relatively clean or clear water into the compartment 29, arrows shown in said pipes in the drawings indicating the direction of flow.

Referring now to FIGS. 1–3, 5, 6, and 8–10, inclusive, and more particularly to FIGS. 3, 5, 6, and 8–10, inclusive, a suction compensating valve 33 is shown which is completely encompassed or surrounded by the clean water compartment 29, such valve 33 being saddle mounted on the suction pipe 13 as near as possible to the suction mouth piece 21, and thus as near as possible to the orifice 20.

Figure 8:
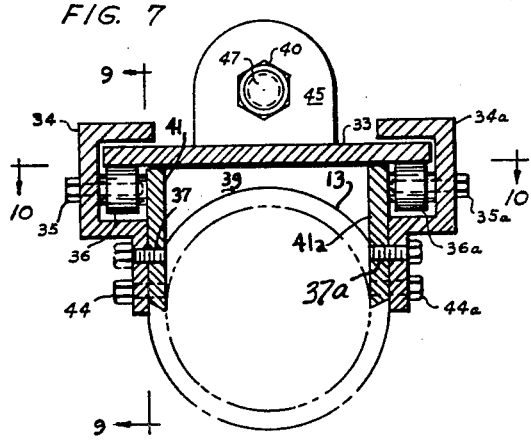
FIG. 8 is a greatly enlarged transverse sectional elevation showing details of the compensating suction saddle valve chest shown to smaller scale in FIG. 5.

Referring now to FIG. 8, the valve 33 is shown to comprise a relatively square, heavy plate slide valve slidably arranged within identical respective starboard and port guides 34 and 34a which comprise longitudinally extending channel brackets. Such guides 34 and 34a support a plurality of bearing pins 35 and 35a on which are respectively mounted a plurality of rollers 36 and 36a to support the slide valve 33.

Figure 9:
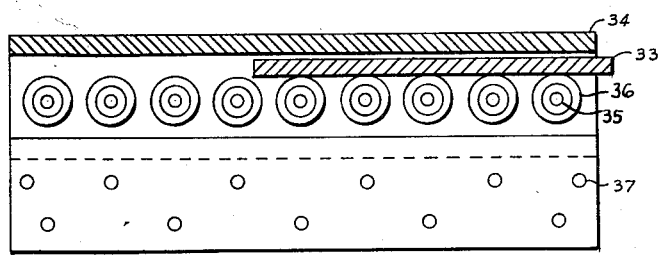
FIG. 9 is an enlarged fragmentary longitudinal sectional elevation taken along line 9—9 of FIG. 8.
Figure 10:
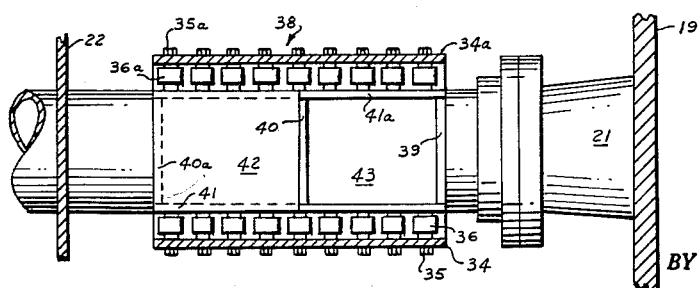
FIG. 10 is an enlarged fragmentary plan view, part in section, taken along line 10—10 of FIG. 8.
Figure 4:
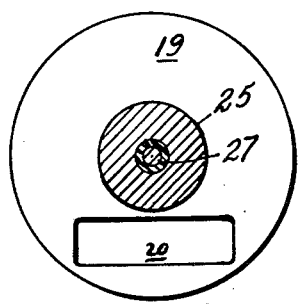
FIG. 4 is an end elevational view of the outer end of the ladder, part in section, taken along lines 4—4 of FIG. 1.
Figure 5:
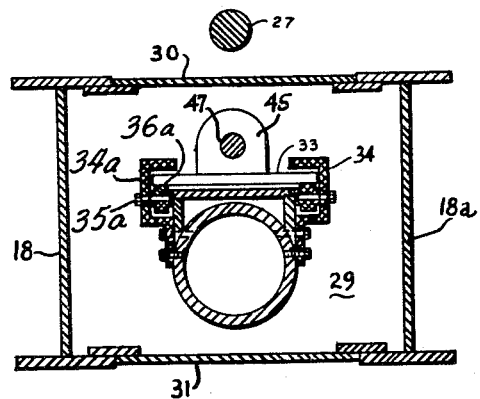
FIG. 5 is an enlarged transverse sectional elevation taken along line 5—5 of FIG. 2.
Figure 7:
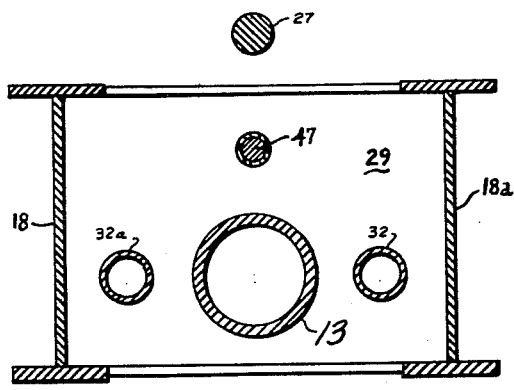
FIG. 7 is an enlarged transverse sectional elevation taken along line 7—7 of FIG. 2.
Figure 6:
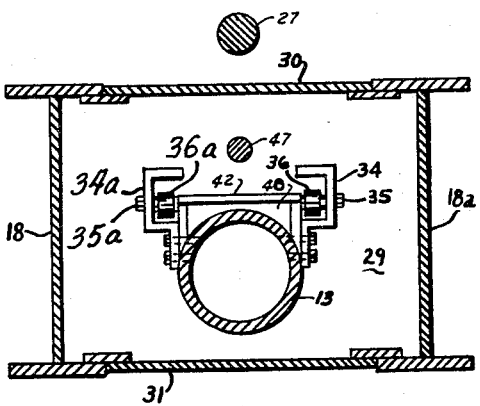
FIG. 6 is an enlarged transverse sectional elevation view taken along line 6—6 of FIG. 2.

As shown in FIG. 9, a plurality of bolt holes 37 and 37a are provided in the lower parts of the respective valve guides 34 and 34a. Now, with reference to FIG. 10, a compensating valve chest 38 is shown formed transversely by a forward saddle plate 39, a central saddle plate 40, and an after saddle plate 40a, and longitudinally by a starboard side plate 41 and a port side plate 41a.

As upper horizontal or plan element the valve chest 38 comprises an after flush top plate 42. When assembled said aforesaid plates complete the compensating suction valve chest 38. The forward saddle plate 39 has provided therein the orifice 43, through which the compensating water enters.

Each of the aforesaid side plates have drilled and tapped therein a plurality of bolt holes, identical with the plurality of bolt holes 37 and 37a located in pattern as indicated in FIG. 9, said bolt holes being provided to receive therein a respective plurality of threaded cap bolts 44 and 44a, by means of which the guides 34 and 34a are secured to the valve chest.

As shown in FIGS. 1 and 8, a crosshead 45 is connected to the after end of the compensating valve 33 to upstand therefrom. Referring now to FIG. 1, a piston rod 47 has forwardly a reduced diameter threaded end which has a nut 46 threaded upon its end to bear upon the forward face of the crosshead 45. The piston rod 47 extends aft through the forward end of a servo-motor cylinder or valve motivating means 48 to carry a piston 49 slidably within the cylinder. Aft of the piston 49 the piston rod 47 projects through the after end of the cylinder 48, as indicated.

The after end of the piston has a drive pin 50 extending transversely therefrom to drive a yoked reduction lever ball crank 51 pivoted thereon. Spaced from the pin 50 the lever 51 pivots on a bracket mounted fulcrum pin 52. A link 53 has one end thereof pivotally connected to the end of the lever 51 opposite the pin 50, and the opposite end of the link 53 is pivotally connected to a bell crank lever 54, which pivots on a bracket mounted pin 55. At the top of the bell crank lever 54 there is pivotally connected the after end 56 of a floating feed back tail rod 57.

The feed back tail rod 57 has a transverse pin 58 extending therefrom on which is mounted the yoke end 59a of a position indicator hand or pointer 59 which indicates the position of the compensating suction valve 33, as will be hereinafter described. The position indicator hand or pointer 59 is pivotally connected to a pivot pin 60a which extends from an indicator or index quadrant or plate 60 which has reference graduations thereon in terms of valve 33 positioning. The end of the pointer 59 opposite its yoke end 59a has an arrow head 61 thereon to point to such reference graduations.

A clevis connection 62 at the forward end of the feed back tail rod 57 has the upper end of a vertical floating differential mix link 63 pivotally connected thereto, the functions of the differential mix link 63 being directed to accomplish a purpose to be described hereinbelow.

Referring back now to the series of elements immediately hereinabove described, it is pointed out that the feed back tail rod 57, the bell crank lever 54, the link 53, and the yoked reduction lever 51 taken together comprise functionally a feed back mechanism to carry out purposes apparent from its construction, and to be hereinbelow described in further detail.

The differential mix link 63 is pivotally mounted centrally on a clevis pin 64 of an element to be hereinbelow described. Also a second clevis connection 65 is provided at the lower end of the differential mix link 63 by which the mix link 63 is pivotally connected to a floating selector control link 66. The after end of the control link 66 provides a clevis connection 67 by which pivotal connection is made to a valve rotor actuating lever 76.

Such lever 76 corresponds to the initially actuated element of a system, mechanism, or functional assembly, which taken together correspond in a servo-mechanism to the source of power, as a prime mover, which is used to bring about corrective action, and the operation of elements hereinbelow described will set forth how such correction is effected. Also the feed back tail rod 57, the mix link 63, and the selector control link 66 at this point are initially described as together comprising the mechanical differential or differential means 68.

Below the elements comprising the differential 68 a rotary four-way selector valve or control means 69 has located in its valve housing successively a pressure inlet port 70, a first selector port 71, an exhaust port 72, and a second selector port 73. A valve rotor 74 rotatable within the housing has a rotor actuating lever 76 connected rigidly thereto externally of the housing. A fixed first selector stop 77 is provided to extend from the housing to the lower left of the lever 76, as shown in FIG. 1, and a second fixed selector stop 78 is provided to extend from the housing to the upper right of the lever 76, as thus shown. As aforesaid, the upper end of the lever 76 is pivotally or clevis connected to the after end of the selector control link 66.

Figure 11:
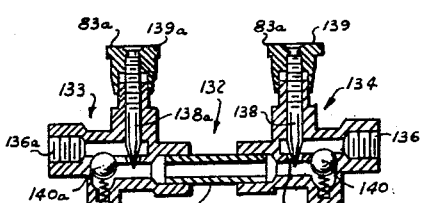
FIG. 11 is a sectional view of a two-way flow control valve of the kind shown in the diagrammatic portion of FIG. 1.

A pipe 79 connects port 73 of the selector valve 69 with the after inlet port 80 of the servo-motor 48. Similarly a pipe 82 connects the forward port 81 of the said servo-motor with the first selector port 71 of the selector valve 69. Interposed in the pipe 82 is a standard two-way flow control valve 82a, as will be hereinbelow described, as shown in FIG. 11. The two-way flow control valve can regulate the flow of control fluid in either direction since its control means can be adjustably regulated within ranges permitting fullest flow in one direction and substantially smallest degree of flow in the other direction, thereby retarding flow to the point of dwelling.

A fluid sump 83 contains fluid which is drawn therefrom through a pump suction line 84 to be delivered by a fluid pressure pump 85 through a discharge pipe 86. A branch pipe 87 extends from its junction with the discharge pipe 86 and supports a pressure gauge 88. The discharge pipe 86 extends upwardly and afterwardly from its junction with the branch pipe 87 to communicate with the pressure inlet port 70 of the selector valve 69. As shown in FIG. 1, the pressure inlet port 70 of the valve housing communicates with the open center port 75 through the valve rotor 74 which in turn communicates with the exhaust port 72 in the valve housing opposite the inlet port 70. The exhaust port 72 of the selector valve 69 communicates with a fluid return pipe 89 to the sump 83. A pipe 90a from the discharge pipe 86 has a pressure relief valve 90 therein and below the pressure relief valve 90 the pipe 90a drains into the sump 83.

A riser pipe 91 communicating with the suction pipe 13 from a location adjacent the pump 14 supports a vacuum gauge 92 having a needle or pointer 93 which points to graduations in terms of inches of mercury to more clearly indicate various vacuum-pressure and consequent velocity relations. Also, a bottle shaped diaphragm separator type pressure accumulator 94 upstands from and communicates with the discharge 15 from the pump 14. The rubber diaphragm separator 95 traps the gritty fluid contents of the pumpings, thereby preventing their entry into the clean fluid of the discharge pressure gauge line 96, and consequently prevents the impairment of the gauges and servo-actuators which the gauge line serves.

A branch pipe 97a from the gauge line 96 supports a discharge pressure gauge 97 having a needle 98 which points to graduations on the gauge in terms of pounds per square inch to indicate the various pressure-vacuum and consequent velocity relations.

Any difference from the gauge normal as shown constituting 50 p.s.i. pressure reading and 15 inches of mercury vacuum reading, as indicated by the reference numeral 99 in FIGURE 1 is a reflection of the pressure differential. Obviously an overload in the suction line causes an increase in indicated vacuum and conversely a decrease in indicated discharge line pressure. On the other hand, any overload in the discharge line as indicated by an increase in pressure gauge reading is accompanied by a decrease in the vacuum gauge reading.

As shown in the upper right of FIG. 1, a relatively small, short stroke cylinder of a low pressure, high vacuum servo-actuator 100 has a single fluid pressure inlet pipe 101 extending from the gauge line 96 to its forward end. A two-way flow control valve 101a is interposed in the pipe 101 betweeen the gauge line 96 and the servo-actuator 100, to function as will be hereinbelow described.

A piston 102 is slidable within the actuator cylinder 100 and a piston rod 103 extends from the piston 102 and slidably through the after end wall of the cylinder 100 and spaced from the cylinder 100 the piston rod 103 has a stop collar 104 thereon. Spaced from the stop collar 104 at the after end of the piston rod 103 an angle end pull rod 105 extends transversely therefrom.

A fixed stop 106 is provided to be contacted by the lower after face of the collar 104, and thrusting on the after face of the collar 104 is the roller end of an angular spring lever 107 which pivots on a pin 108, and its upper and opposite end is attached to a tension spring 109 swivelly supported in the screw of its adjusting knob 110.

As shown in FIG. 1, a relatively small, short stroke cylinder 111 is spaced aft of the cylinder 100 with axis in the same vertical plane with the axis of the cylinder 100, but with axis spaced vertically from a co-axial extension of the axis of the cylinder 100. The cylinder 111 serves as a high pressure low vacuum servo-actuator from the after end of which extends a single fluid pressure inlet pipe 112 which branches from the end of the gauge line 96 at its junction with the inlet pipe 101 to the actuator cylinder 100. A two-way flow control valve 112a is interposed in the pipe 112.

A piston 113 within the actuator 111 has a piston rod 114 which extends from the cylinder 111. Outwardly thereof a thrust collar 115 is mounted thereon with the piston rod 114 terminating forwardly in a push rod 116. The lower end after face of the collar 115 contacts a fixed stop 117, and the roller end of an angular spring lever 118, pivoting on a pin 119, thrusts upon the upper forward face of the collar 115, while at its upper end opposite end the lever 118 is attached to a tension spring 120 which is swivelly supported in the screw of its adjusting knob 121.

Pivoted on a fulcrum pin 122 is a vertical pressure actuator lever 123 which is contacted on its lower after fulcrum face by the angle end pull rod 105 of the piston rod 103 of servo-actuator 100. Such lower after fulcrum face is also contacted by the forward end of the push rod extension 116 of the piston rod 114 of the servo-actuator 111. At its upper end the lever 123 is pivotally connected to a rigid feel rod 124, the after end of which contacts a vertically extending face plate 125 which has a rigid input command rod 126 extending afterwardly therefrom for pivotal connection to the mechanical differential mix link 63 by means of the pivot pin 64, hereinabove described. The term actuator means may include the flow condition and detection device 94, actuator 100 and 111, and actuator 123. Optionally, it may include the control means 69.

The face plate 125 is held against a fixed stop 127 by a spring 128 which urges the face plate 125 forwardly. Forward of, and adjacent to, the position indicator 60 in FIG. 1 is shown the index quadrant of a multipurpose manual servo-actuator 129 which is correlated with the aforesaid position indicator 60. A manually operated latch lever 130 is pivotally mounted on fulcrum pin 131 carried by the index quadrant, and at its lower fulcrum end the lever 130 is connected to a feel rod 132, the after end of which thrusts against the input command rod face plate 125. The index quadrant of the manual servo-actuator 129 is graduated in correspondence with the quadrant of the position indicator 59, and the arc of the servo-actuator 129 has equally angularly spaced apart teeth therein with which the latch lever 130 may be selectively latched by manual operation.

The similarly constructed, conventional two-way flow control valves 82a, 101a, and 112a, shown diagrammatically in FIG. 1 are shown in an assembly detail 132 in FIG. 11. Such assembly includes oppositely extending valves 133 and 134 connected by a connecting nipple 135. In FIG. 11 pressure fluid enters the inlet passage 136 of valve 134 and the pressure of the inlet fluid unseats an upwardly urged seated check valve 140 so that the inlet fluid passes in full flow past the check valve 140. Also a small amount of the pressure fluid may leak past the restricted passage 137 controlled by the needle valve 138 as adjusted by the micrometer or vernier nut 139. The fluid continues through the nipple 135 into valve 133, where its flow is limited to the amount which may pass by the needle valve 138a, as adjusted by the nut 139a. The fluid thus passes as urged by the pressure fluid which has entered valve 134, to pass with dash-pot action into, and out of the passage 136a of the valve 133. When the pressure fluid enters the inlet passage 136a of the valve 133 the operation is in correspondence with, but oppositely of that hereinabove described upon the case of pressure fluid entering the valve 134.

*Operation*

The operation of the velocity control governor may be followed hereinbelow, beginning with the setting in of a condition which, if allowed to continue, would result in choking up the suction pipe 13. As this condition begins the vacuum gauge 92 starts to indicate an increase in vacuum and if the condition were allowed to fully develop the gauge pointer 93 would move to indicate a vacuum approximating 20 inches of mercury. Correlatively with any tendency to increase the vacuum pulled by the pump 14, a corresponding tendency to decrease pressure in the discharge pipe 15 occurs, since the pump tends not to discharge at capacity or thereabouts because of the tendency to increase the vacuum it is pulling. Thus the fluid pressure acting upwardly against the accumulator diaphragm 95 tends to drop, and accordingly the fluid pressure in the branch pipe 97a tends to drop so that the pressure indicated by the pressure gauge tends to fall off toward an indication of say 45 p.s.i. which would be indicated if the tendency should be allowed to continue until a substantially full choke occurred in the suction line 13.

The consequent drop in the pressure gauge line 96 permits the piston 102 in the low pressure-high vacuum actuator 100 to duplicate the movement of the pressure gauge 97, and accordingly the piston 102 moves to the right from the position shown in FIG. 1, so that the thrust collar 104 moves away from the stop 106 as urged by the spring actuated lever 107, the spring tension now being of greater force than the opposite urging of the gauge pressure fluid. The adjustments which may be made by the nuts 139 and 139a of the two-way flow control valve 101a control the desired type of dash-pot action to be achieved thereby.

As the piston rod 103 is moved forwardly from its position as shown in FIG. 1, the angle end pull rod 105 pivots the lower end of the pressure actuator lever 123 forwardly and the upper end therof aft to cause the feel rod 124 to push the command rod face plate 125 aft and with it the command rod 126 is moved aft to move the lower end of the differential mix link 63 aft, thereby pivoting the rotor actuating lever 76 in the housing of the selector valve 69 in a counter-clockwise direction toward or to the first selector stop 77. The valve rotor 74, which is rigidly connected to the lever 76, is correspondingly pivoted so that fluid from the discharge pipe 86 from the pressure pump 85 flows forwardly of the valve rotor 74 in the housing of the selector valve 69 and passes out through the pipe or conduit 82 to enter the forward end of the servo-motor cylinder 48 through the port 81. The pressure of the fluid thus admitted urges the servo-motor piston 49 aft, and with it its piston rod 47, to slide the slide valve 33 aft, thereby to position it in compensating position to admit water from the compartment 29 into the suction pipe 13.

The clean water is thus drawn into the suction pipe 13 to be added to the mixture of water and material drawn in through the suction orifice 20 so that the dredging flow through the suction pipe is further homogenized and the gauge pressure, the vacuum gage reading, and the velocity of flow are all kept at predetermined normal operating conditions, thus to re-establish say 50 p.s.i. gauge pressure, 15" of mercury vacuum reading, and velocity flow of 20 feet per second.

The pressure fluid thus entering the servo-motor cylinder 48 forces the piston 49 aft, as aforesaid, so that the drive pin 50 on the after end of the piston rod 47 urges the lower, longer end of the reduction lever 51 aft, thereby pivoting the upper, shorter end forwardly to carry with it the link 53, and the lower end of the bell crank 54 connected to the link 53. This moves the upper end of the bell crank 54 aft to draw with it the feed back tail rod 57 thereby to position the indicator hand arrow head 61 to indicate a graduation corresponding to the degree of opening of the slide valve 33.

As this occurs, the pin 64 retains the position to which it has been urged by the command rod 126 responsive to the input signal transmitted thereto by the actuator lever 123 acting through the feel rod 124 and the command rod face plate 125 from which the command rod 126 extends. Then, since the upper, longer end of the differential mix link 63 has been pulled aft by the feedback tail rod 57 of the feedback mechanism terminating at the clevis link 62, the lower shorter end of the mix link is consequently pivoted forwardly and in degree that the selector control link 66 connected to such lower end pivots the rotor actuating lever 76 forwardly or in clockwise direction to or toward the second selector stop 78 on the housing of the selector valve 69. The rotation of the lever 76 thus carries it in clockwise direction past the position it is shown occupying in FIG. 1.

The valve rotor 74 is thus positioned by this rotation of the lever 76 to establish fluid communication from the pressure pump discharge pipe 86 through the pressure inlet port 70, the housing of selector valve 69, the second selector port 73, the pipe or conduit 79, and the after port 80 of the servo-motor cylinder 48 to urge against the after face of the piston 49 to force it forwardly. The piston rod 47 is thus moved forwardly to close the slide valve 33. As this occurs the fluid in the servo-motor cylinder 48, forward of the piston 49, is forced out the forward port 81 through the pipe or conduit 82 and the two-way control valve 82a and the first selector port 71 and the housing of the selector valve 69 to pass through the exhaust port 72 back through the drain pipe 89 to the sump 83.

Responsive to the returning of the gauge needle 98 to the predetermined reference or normally indicated position, corresponding with 50 p.s.i. in the discharge line 15, the gauge or control fluid pressure at 50 p.s.i. acts through the dash-pot arrangement of the two-way control valve 101a to urge the low pressure-high vacuum actuator piston 102 aft and with it the piston rod 103. Thus the thrust collar 104 moves aft therewith against the opposing force of the spring 109 urging against the spring lever 107 which bears upon the after face of the thrust collar 104. The angle end pull rod 105 on the after end of the piston rod 103 is thus moved aft, thereby permitting the spring 128 to pull the command rod face plate 125 forward to urge the feel rod 124 forward, whereby the actuator lever 123 returns to up-and-down position so that its after lower face returns into contact with the angle end push rod 105 as the command rod face plate 125 returns into contact with the fixed stop 127. As this occurs the differential mix link clevis pin 64 is urged forward into the initial position shown in FIG. 1 and the differential mix link 63 assumes the position of FIG. 1, such being accomplished by the feedback mechanism as the piston rod 47 is moved forward, causing the feedback tail rod pin 62 to return the mix link 63 to initial position.

In case a condition tends to excess, which, if uncontrolled, would result in an undue increase of fluid pressure in the discharge pipe 15, this possibility is immediately counteracted by pressure fluid from the gauge line 96 passing through the dash-pot action of the two-way flow control valve 112a to flow through the inlet pipe 112 into the actuator cylinder 111 to urge the piston 113 forwardly. This moves the thrust collar 115 on the piston rod 114 forwardly against the tension of the spring 120 so that the push rod or piston rod end 116 urges against the lower after face of the pressure actuator lever 123 to pivot the lower end of the pressure actuator 123 forwardly. Beginning at column 8, line 2, with the word "and" and continuing through column 8, line 75, through "valve," the operation for a tendency of discharge line pressure to increase is identical with the operation for a tendency of the vacuum in the suction pipe 13 to increase, as described in such pages and lines. As return to normal, reference, initial, or predetermined basic operating gauge pressure takes place, "the two-way control valve" 112a lets pressure fluid pass forwardly therethrough as the accumulator diaphragm 95 moves downwardly responsive to pressure drop in the discharge line 14, so that the feel rod 124 may recede forwardly as the spring 128 urges the command rod face plate 125 forwardly to return into contact with the fixed stop 127. This forward movement of the command rod 126 returns the differential mix link 63 to the position shown in FIG. 1.

The manually operated servo-actuator 129 is employable for a variety of purposes, as, for instance, to establish the initial or stopped position of the command rod face plate 125 in case it is desired to increase the pressure and/or vacuum differential which must exist before the command rod 126 is moved by action of either of the actuators 100 and 111. Also the lever 130 of the servo-actuator 129 may be moved to change the overlap or "dead band" range of the slide valve 33 of the chest which opens into the suction pipe 13. The servo-actuator 129 also acts as a manual load limiting device, since it sets a limit as to the consistency of the flow passing through the dredge line, and to the responsiveness of the system to pressure and/or vacuum change. The servo-acuator 129 and the position indicator 59 are duplicates as to the signals imparted, the two indicators in effect being pantograph connected so that the position indicator 59 must follow and indicate any graduation to which the latch lever 130 is moved.

As certain materials are of a character to require less control than others, adjustment to increase the differential before the actuators 100 or 111 may act is accomplished by moving the latch lever 130 forward or clockwise, thereby moving the feel rod 132 aft, so that its position, rather than the stop 127, limits the forwardmost position to which the face plate 125 may be moved to a reference position.

As a feature of construction the pressure pump 85 can be set to operate below any predetermined pressure, that is, the relief valve 90 may be adjusted to open if the pressure of the power system fluid in the discharge line 86 exceeds the predetermined pressure at which the relief valve is set so that the pump begins by-passing fluid through the relief valve 90.

The power or pressure pump 85 discharges fluid to be recirculated in a continuous system through the central passage or port 75 through the valve rotor 74 and back to the sump 83 when the actuators 100, 111, or 129 are not being employed. In such idling position the fluid on either side of the valve rotor 74 and in the respective lines 73 and 82 to the servo-motor 48, and on the respective aft and forward sides of the piston 49 is locked as in a locked ram.

The specification hereinabove and the drawings disclose a hydraulic system, but other structures and systems are considered as well, such as pneumatic, electric or mechanical transmission systems and structures. The invention is thus not limited to the preferred embodiment thereof shown in the above specification and in the drawings but other variations, embodiments, and modifications are considered as well as such may fall within the broad spirit of the invention and within the broad scope of interpretation claimed for and merited by the appended claims.

What is claimed is:

1. In combination with a dredge line including a dredge, a dredge pump supported thereby having a suction line flexibly connected thereto and a discharge line extending therefrom, a ladder mounted on said dredge, and a power driven cutter mounted on said ladder, said ladder extending into the water to position said cutter and said suction line to respectively cut and receive suction, the improvement of a constant velocity governor comprising a compartment included in said ladder adjacent the inlet into said suction line and receiving water from a spaced distance therefrom, gauge means connected to said discharge line to indicate fluid pressure therein and actuated responsive to changes in said fluid pressure, a servo-motor and a valve operated thereby to control opening from said compartment into said suction pipe, a pressure balanced, first actuator operable responsive to decrease in gauge fluid pressure, a pressure balanced, second actuator operable responsive to increase in gauge fluid pressure, a command rod means urged in the same predetermined direction by operation of either actuator, a resilient means for yieldably urging said command rod means in opposition to said predetermined direction, a differential mechanism normally occupying a first position and moved by said command means movement in said predetermined direction to a second position, a feedback mechanism, a pressure pump supplied, four-way valve actuated by movement of said differential mechanism to said second position to supply pressure fluid to actuate said servo-motor to move said control valve in opening direction whereby to change dredge line and gauge back toward normal pressure and to move feedback mechanism to move said differential mechanism to a third position to actuate said four-way valve to supply fluid to actuate said servo-motor to move said control valve in closing direction, whereby to achieve a normal velocity dredge line flow as such servo-motor actuation thereby moves said feedback mechanism to return said differential mechanism to said first position as said resilient means urges said command means to an initial stopped position.

2. In combination with a dredge line including a dredge, a dredge pump supported thereby having a suction line flexibly connected thereto and a discharge line extending therefrom, a ladder mounted on said dredge, and a power driven cutter mounted on said ladder, said ladder extending into the water to position said cutter and said suction line to respectively cut and receive suction, the improvement of a constant velocity governor comprising a compartment included in said ladder adjacent the inlet into said suction line and receiving water from a spaced distance therefrom, gauge means connected to said discharge line to indicate fluid pressure therein and actuated responsive to changes in said fluid pressure, a servo-motor and a valve operated thereby to control opening from said compartment into said suction pipe, a pressure balanced, first actuator operable responsive to decrease in gauge fluid pressure, a pressure balanced, second actuator operable responsive to increase in gauge fluid pressure, a command rod means urged in the same predetermined direction by operation of either actuator, a resilient means for yieldably urging said command rod means in opposition to said predetermined direction, a differential mechanism normally occupying a first position and pivotally connected near one end to said command means, upon movement of said command rod in a predetermined direction said differential mechanism being moved to a second position, a follow-up mechanism pivotally connected at one end to an end of said differential mechanism and stationary during differential movement to said second position, a power supplying means set operable by said movement to said second position to actuate said servo-motor to move said control valve in infinitesimally varying, opening positional movements as required whereby to admit compartment water to change dredge line and gauge pressures, back toward normal, said servo-motor at the same time moving said follow-up mechanism to a third position without further movement of said command rod means, said differential mechanism upon moving to said third position actuating said servo-motor to move said control valve in infinitesimally varying closing positioning movements as required to achieve a normal velocity dredge line flow as such servo-motor actuation thereby moves said follow-up mechanism to return said differential mechanism to said first position as said return means urges said command means to an initial stopped position.

3. The combination as claimed in claim 2 in which additionally includes a manually operable means to move said command means in said predetermined direction to establish new differential mechanism first position whereby either actuator must be moved a further distance responsive to gauge pressure change prior to coming into urging contact with said command means.

4. A dredge pump assembly providing automatically controlled constant flow conditions comprising, a dredge pump, a suction line and a discharge line secured thereto, conduit means supplying clean water having an inlet means extending upwardly to a point substantially below said pump and an outlet of the conduit means communicating with said suction line at a point closely adjacent the inlet to said suction line for admitting clean water adjacent said suction line inlet, valve means operatively associated with said conduit means and positioned substantially remote from said pump to control fluid passing through said conduit means into said suction line, valve motivating means connected to said valve means for moving said valve means, actuator means proportionally responsive to the magnitude of flow and pressure in said lines, said actuator means including an actuator proportionately operable by a decrease in pressure in said discharge line and by signal communication, being operatively associated with said valve motivating means to automatically activate said valve motivating means to proportionally move said valve means to a selected position to offset variations in discharge flow, said actuator means including a flow condition and pressure variation detection device maintaining said actuator means continually proportionately responsive to said variation and feed back means secured to said assembly operable by said actuator means to reverse said movement of said valve means.

5. The dredge pump assembly of claim 4 including overriding limit means active upon at least a portion of said actuator means to limit the action of the actuator means and operable to maintain said valve means in any degree of opening.

6. The dredge pump assembly of claim 4 wherein said actuator means includes a control means operative automatically to open and close said valve means by means of said valve motivating means to maintain a normal flow and pressure through said lines.

7. The dredge pump assembly of claim 4 wherein said feed back means is operatively associated with said valve motivating means and adapted to act oppositely to said valve motivating means to control the positioning of said valve means.

8. The dredge pump assembly of claim 7 including overriding limit means active upon at least a portion of said actuator means to limit the action of the actuator means and operable to maintain said valve means in any degree of opening.

9. The dredge pump assembly of claim 7 wherein said actuator means includes a differential means operatively connected to said feed back means and operable on said control means for said valve means, said differential means translating movement of said feed back means to said control means.

10. The dredge pump assembly of claim 9 wherein the differential means comprises a mix link pivoted at one end to said feed back means and at the other end to said control means and said actuator means includes command rod means pivotally connected to said differential means, said rod means being operable to move said differential means to a position maintaining said valve means open.

11. The dredge pump assembly of claim 10 including an overriding latch lever means adapted to independently engage said command rod means to thereby move and maintain said valve means open.

12. The dredge pump assembly of claim 4, wherein said conduit means encloses said valve means and at least part of said suction line at a point closely adjacent said suction inlet.

13. The dredge pump assembly of claim 4, wherein said conduit means comprises a clean water compartment which completely encloses and protects said valve means and at least partially encloses said suction line at a point closely adjacent the suction line inlet, and wherein said compartment includes clean water supply pipes extending substantially upwardly from said compartment and terminating substantially below said dredge pump.

14. A dredge pump assembly providing automatically controlled constant flow conditions comprising, a dredge pump, a suction line and a discharge line secured thereto, conduit means supplying clean water having an inlet means extending upwardly to a point substantially below said pump and an outlet communicating with said suction line at a point closely adjacent the inlet to said suction line for admitting clean water adjacent said suction line inlet, valve means operatively associated with said conduit means to control fluid passing through said conduit means into said suction line, valve motivating means operatively associated with said valve means to move said valve means, a control means operatively associated with said valve motivating means for causing activation of said valve motivating means, a feed back means operatively associated with said valve motivating means and being responsive to movement of said valve motivating means by said control means, differential means operatively controlling said control means and said feed back means and operable to receive response from said feed back means to activate the control means, pressure variation detection means connected to one of said lines and being continually operable to move said differential means to a position proportional to the pressure variation from normal and maintain said differential means in a position operable to effect automatic continual control over said control means, said feed back means and thereby said valve means as long as a pressure variation from normal exists.

15. The dredge pump assembly of claim 14 including overriding limit means active upon at least a portion of said pressure variation detection means to limit the action of said pressure variation detection means and operable to maintain said valve means in an open position.

16. The dredge pump assembly of claim 14 wherein said valve motivating means comprises a fluid actuated motor, and said feed back means comprises crank means connected to said motor.

17. The dredge pump assembly of claim 16 wherein said crank means is pivotally connected to said differential means to move said differential means in a direction offsetting the movement initiated by said pressure variation detection means.

18. The dredge pump assembly of claim 17 including overriding limit means active upon at least a portion of said pressure variation detection means to limit the action of said pressure variation detection means and operable to maintain said valve means in an open position.

19. The dredge pump assembly of claim 14, wherein said detection means includes a first detection means operably connected to the discharge line to detect decreases in discharge line pressure and a second detection means operably connected to the discharge line to detect increases in discharge line pressure.

20. A dredge pump assembly providing automatically controlled constant flow conditions comprising, a dredge pump, a suction line and a discharge line secured thereto, conduit means supplying clean water having an inlet means extending upwardly to a point substantially below said pump and an outlet communicating with said suction line at a point closely adjacent the inlet to said suction line for admitting clean water adjacent said suction line inlet, said conduit means surrounding said suction line and including pipe means providing fluid communication between the interior of said conduit means and a point substantially remote from said suction line inlet, valve means operatively associated with said conduit means and positioned substantially adjacent the suction line inlet remote from said pump to control fluid passing through said conduit means into said suction line, valve motivating means connected to said valve means for moving said valve means, actuator means proportionally responsive to the magnitude of variation in normal flow and pressure in said lines, said actuator means including an actuator proportionately operable by a decrease in pressure in said discharge line and by signal communication, being operatively associated with said valve motivating means to automatically activate said valve motivating means to proportionally move said valve means to a selected position to offset variations, said actuator means including a flow condition and pressure variation detection device maintaining said actuator means continually proportionately responsive to said variation and feed back means operable to reverse movement of said valve means to an open position.

21. A dredge pump assembly providing automatically controlled constant flow conditions comprising, a dredge pump, a suction line and a discharge line secured thereto, conduit means supplying clean water having an inlet means extending upwardly to a point substantially below said pump and an outlet of the conduit means communicating with said suction line at a point closely adjacent the inlet to said suction line for admitting clean water adjacent said suction line inlet, valve means operatively associated with said conduit means and positioned substantially remote from said pump, below said conduit means and adjacent said suction line inlet to control fluid passing through said conduit means into said suction line, valve motivating means connected to said valve means for moving said valve means, actuator means proportionally responsive to the magnitude of flow and pressure in said lines, said actuator means including an actuator proportionately operable by a decrease in pressure in said discharge line and by signal communication, being operatively associated with said valve motivating means to automatically activate said valve motivating means to proportionally move said valve means to a selected position to offset variations in discharge flow, said actuator means including a flow condition and pressure variation detection device maintaining said actuator means continually proportionately responsive to said variation and feed back means secured to said assembly operable by said actuator means to reverse movement of said valve means.

References Cited by the Examiner
UNITED STATES PATENTS

| 1,229,772 | 6/17 | Miller et al. | 37—58 X |
| 2,603,234 | 7/52 | Hofer | 137—488 |
| 2,644,400 | 7/53 | Hofer | 103—11 |
| 2,795,873 | 6/57 | Hoffman | 103—113 |
| 2,889,779 | 6/59 | Hofer | 37—58 X |
| 3,111,778 | 11/63 | Fonnesbeck | 37—58 |

FOREIGN PATENTS 525,744  9/40  Great Britain.

BENJAMIN HERSH, *Primary Examiner.*

JACOB A. MANIAN, ROBERT C. RIORDON,
*Examiners.*